May 22, 1956            J. B. COX            2,746,494
SAW CHAIN WITH INSERT TEETH
Filed May 15, 1951            2 Sheets-Sheet 1
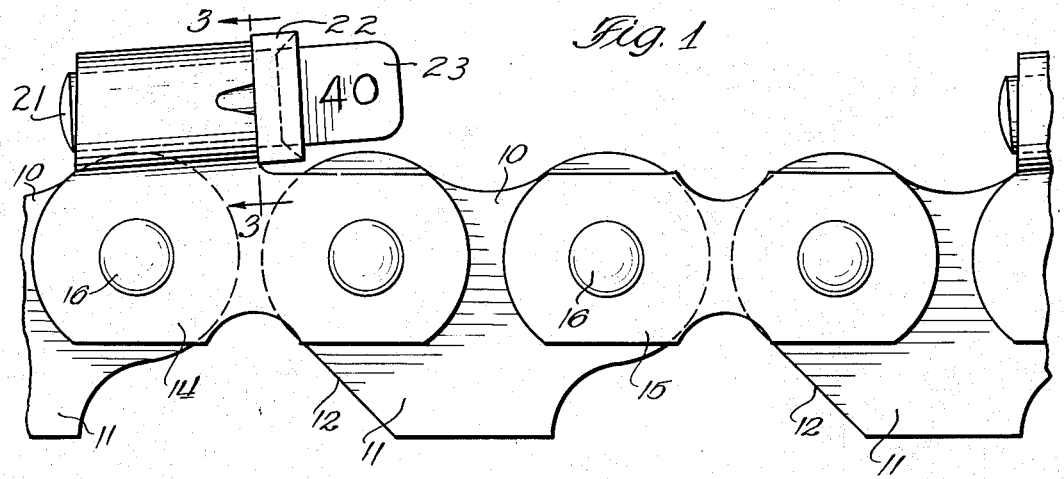
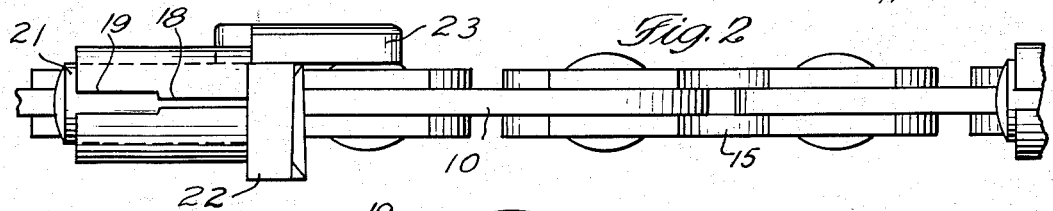
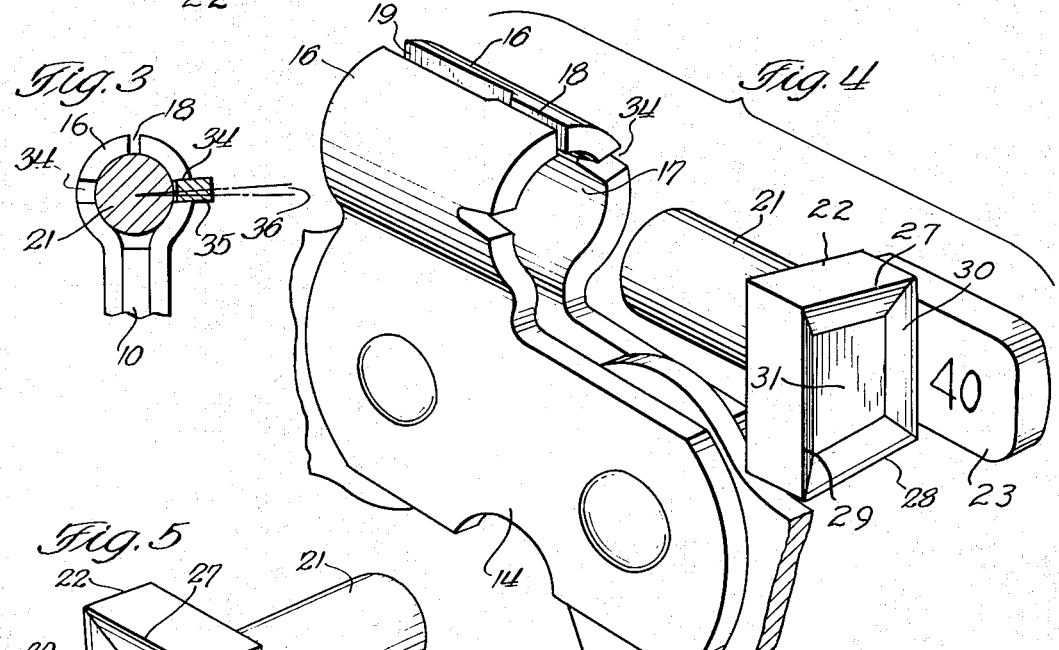
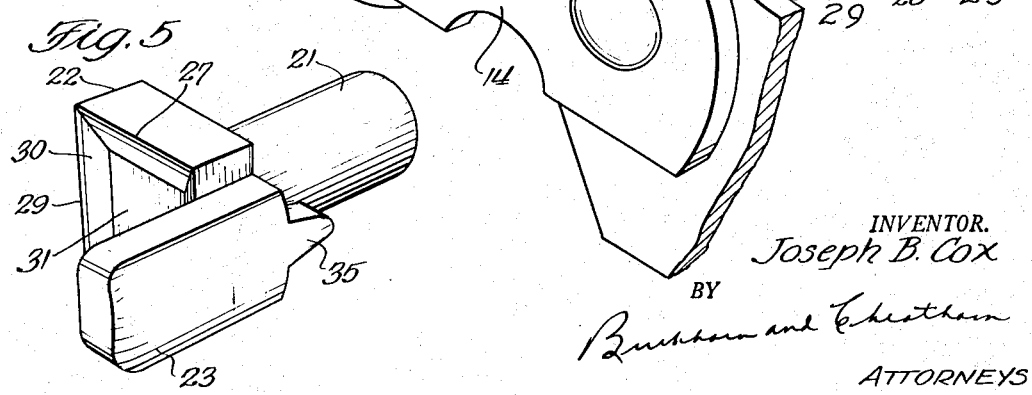
INVENTOR.
Joseph B. Cox
BY
ATTORNEYS May 22, 1956  J. B. COX  2,746,494
SAW CHAIN WITH INSERT TEETH
Filed May 15, 1951  2 Sheets-Sheet 2
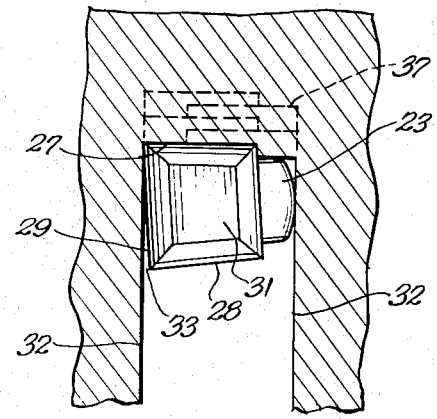
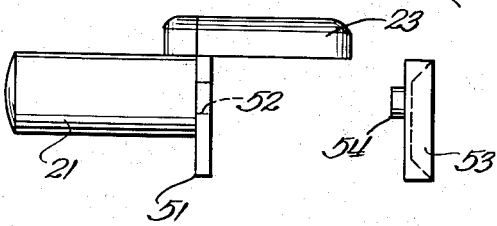
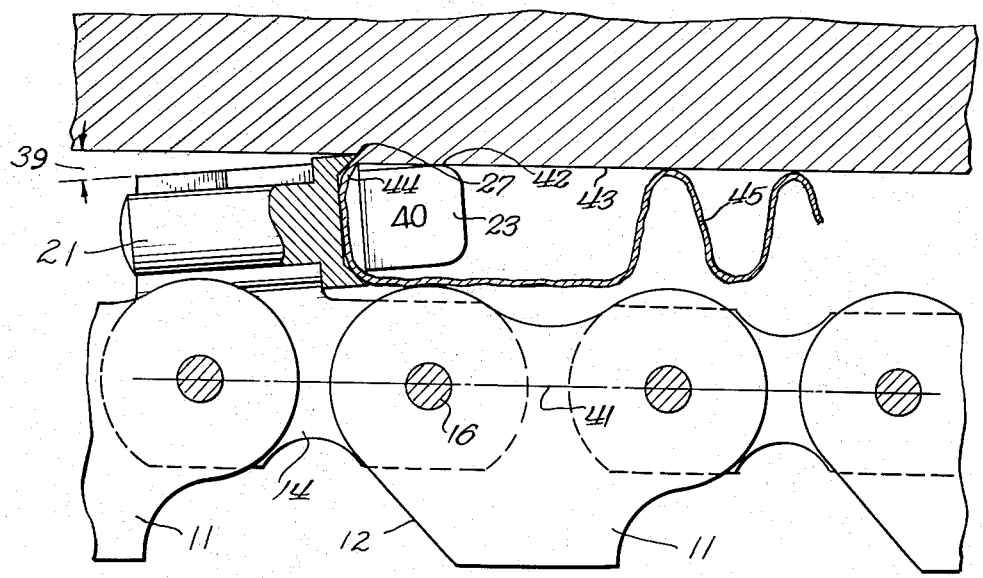
INVENTOR.
Joseph B. Cox
BY
ATTORNEYS United States Patent Office 2,746,494
Patented May 22, 1956

2,746,494

SAW CHAIN WITH INSERT TEETH

Joseph B. Cox, Portland, Oreg., assignor, by mesne assignments, to Oregon Saw Chain Corp., a corporation of Oregon Application May 15, 1951, Serial No. 226,463

18 Claims. (Cl. 143—135)

The present invention relates to saw chains and while it is particularly designed for use in cutting wood, it will become obvious, as the description proceeds that the saw chain of the present invention is also adaptable for cutting minerals and other materials.

The present invention has for its primary object the provision of a saw chain equipped with inexpensive removable cutter elements so secured in position that they may readily be replaced with a minimum of time and effort as they become worn or damaged.

Power saw chains in present common usage have their cutting edges formed directly upon chain link portions. As the cutting edges become worn they must be refiled and the life of the chain is determined by the amount of metal available in the tooth-forming portion. When this metal is worn and filed away the chain must be discarded since it is usually impracticable to disassemble the saw chain and replace the cutter link portions thereof. Moreover the refiling of saw chains is time consuming with the result that much productive time is lost.

It is an object of the present invention, therefore, to provide a new and improved saw chain provided with cutter elements which may be removably attached to the cooperating supporting links of the chain, the cutter elements being of a relatively simple design whereby they may be supplied to the user at low cost so that worn cutter elements may be quickly replaced by new ones at a minimum of expense and with little effort.

A further object of the present invention is to provide a new and novel arrangement for removably securing a cutter element to a saw chain link.

A more specific object of the invention is to provide a new and novel socket arrangement upon a saw chain link for cooperatively receiving the shank of a removable cutter element whereby the cutter element is retained firmly in place in proper position during working operation of the saw chain but which will permit ready removal of the cutter element through the aid of simple tools but without requiring any dismantling operation to be performed upon the saw chain itself.

A still further object of the present invention is to provide a new and novel removable cutter element for saw chains provided with a plurality of cutting edges so disposed thereupon that as one edge becomes worn, the position of the cutter element upon the saw chain may be shifted so as to bring a second sharp cutting edge into operative cutting position; thus the cutter element may be provided, for example, with both right and left cutting edges, only one of which is in use at a time and as one edge becomes worn, the position of the cutter element upon the saw chain may be reversed so as to bring the second edge into operative cutting position.

A still further object of the present invention is to provide a new and novel removable saw chain cutter element having a depth gauge incorporated therewith.

A still further object of the present invention is to provide a new and improved removable cutter element for saw chains having both right and left cutting edges provided thereupon, either one or the other of which is used at a time and a depth gauge being provided upon the cutter element and which is effective for gauging the depth of the cut made with either the right or the left cutting edge in the operative cutting position.

These and many further objects and advantages of the present invention will become apparent as the following description proceeds. In accordance with the illustrated embodiments, the present invention consists essentially of a saw chain link having means in the form of a socket provided thereupon for cooperatively receiving the shank of a removable cutter element. The socket is of elongate tubular shape extending in the direction of the chain while the shank of the cutter element is of complementary shape so as to fit snugly therewithin. The socket is preferably slit lengthwise and the shank of the cutter element slightly oversize so that the shank is gripped tightly due to the resiliency of the socket wall portions but by insertion of the tip of a screw driver into the slot, the socket walls may be spread slightly apart so as to facilitate withdrawal of the cutter element therefrom. The head of the cutter element is provided with oppositely disposed, right and left cutting edges, either of which may be brought into operative cutting position depending upon the manner that the cutter element is inserted in the link socket. A depth gauge is provided on the cutter element extending along one side of the cutter head and projecting forwardly therefrom, the forward end portion of the depth gauge being adapted for riding against the bottom of the kerf ahead of the cutting edge for limiting the depth of cut taken thereby. The depth gauge is symmetrically disposed with relation to the two cutting edges on the cutter element so that it is equally effective irrespective as to which cutting edge is in use. Cooperating means are provided on the cutter head and the forward end of the retaining socket for accurately positioning the cutter element upon the link in either one or the other of its different positions.

For a consideration of what is believed novel and inventive, attention is directed to the following description taken in connection with the accompanying drawings while the features of novelty will be pointed out with greater particularity in the appended claims.

In the drawings:

Fig. 1 is a side elevation of a length of saw chain constructed in accordance with one form of the present invention;

Fig. 2 is a top plan view;

Fig. 3 is a sectional view taken along line 3—3 of Fig. 1;

Fig. 4 is a view in perspective showing a cutter link and cutter unit as incorporated in the views of Figs. 1 and 2;

Fig. 5 is another perspective view of the cutter unit;

Fig. 6 is a front view of a cutter unit shown in a kerf;

Fig. 7 is a side elevational view, partly in section, showing the action of a cutter link in a kerf; and Fig. 8 is an exploded view illustrating component elements of a cutter unit manufactured in accordance with a modification of the invention.

In the following description the invention will be described with particular reference to a saw chain adapted primarily for cutting wood although, as will appear, by reason of the fact that the cutter heads as embodied in the present invention may be formed of very hard metal alloys, such as carbide, the chain saw may also be adapted for cutting minerals.

Referring now to the drawings, the saw chain is made up of a plurality of links pivotally connected together. The saw chain in this instance includes a plurality of centrally disposed link elements 10 having sprocket engaging root portions 11 depending from the lower edge thereof, the rear edge 12 sloping at an angle corresponding to the angle of the faces of the sprocket teeth (not shown). It will be understood that the root portions 11 of the link elements 10 ride within the groove of the saw bar. The link elements 10 are connected together by means of intermediate link elements indicated generally at 14 and 15, each of the link elements 14 and 15 consisting of a pair of oppositely disposed side plates pivotally secured to the link elements 10 by means of rivets 16. The link elements 14 differ from the link elements 15 in that cutter unit retaining means are provided on the upper edge portions of the link elements 14 whereas the link elements 15 have no such means formed thereupon and are thus merely in the nature of spacer elements.

The present invention is concerned primarily with the provision of a cutter unit retaining means upon the upper edge of longitudinally spaced apart cutter link elements of the saw chain and quickly removable cutter elements mounted thereupon. Alternate right and left cutter elements are provided upon the chain. The successive cutter link elements are identical to each other, that is, with the retaining means being centrally disposed thereupon so that either a right or a left cutter unit may be mounted upon any cutter link. Preferably, and in accordance with the preferred embodiment, the cutter units are each provided with oppositely disposed right and left cutting edges, the effective cutting edge being merely dependent upon the manner in which the cutter unit is assembled onto the link element. The cutter units, therefore, are all alike and in assembling them upon the chain alternate ones are merely oppositely positioned.

The cutter unit retaining means shown in this instance is formed by upper edge portions of the pair of side plates of the chain links 14 being bent into a semicylindrical configuration as shown more clearly in the sectional view of Fig. 3 and the perspective view of Fig. 4. These semicylindrical portions 16 define an elongated tubular receptacle or socket 17 which extends in the direction longitudinally of the chain, the longitudinal axis of the socket 17 being aligned with the longitudinal centerline of the chain or, in other words, the axis of the socket 17 lies in a plane common with the longitudinal centerline of the saw chain. The socket 17 is open at both ends for reasons as will subsequently appear while the upper edges of the socket defining portions 16 are spaced slightly apart so as to provide a slit 18 therebetween. The rearward portion of the slit 18 is enlarged as indicated at 19 for reasons as will be subsequently pointed out.

The cutter element consists essentially of a shank portion 21 of such a shape as will fit complementarily and snugly within the receptacle formed on the link unit 14. It is preferred that both the receptacle socket 17, and the shank portion 21 be of cylindrical configuration. The length of the shank portion 21 of the cutter unit is preferably slightly greater than the length of the receptacle socket 17 so that the rear end of the shank portion will protrude slightly from the rear end as shown more clearly in the views of Figs. 1 and 2. Either attached to the forward end of the shank portion 21, or formed integrally therewith, is a cutter head 22 which extends substantially at right angles with respect to the longitudinal direction of the shank 21 and extends laterally outwardly therefrom on at least three sides. Also attached to the cutter head and the shank portion and extending forwardly of the cutter head by a substantial distance is a depth gauge element 23. Referring for the moment to the view of Fig. 6, it will be observed that the combined width of the depth gauge portion 23 and the cutter head 22 corresponds to the width of the kerf cut by the saw chain.

The cutter head 22, in this instance, is substantially square as viewed from the front such as in Fig. 6. Spaced apart right and left cutting edges 27 and 28 are provided along the upper and lower edges of the cutter head, respectively, while a third side wall cutting edge 29 is provided joining the outer ends of the cutting edges 27 and 28. The cutting edges 27, 28 and 29 are formed by inward bevels 30 converging toward each other from the four edges of the cutter head and terminating at the bottom wall 31. The face surface of the cutter head 22, therefore, is provided with a cup-shaped recess. As viewed more clearly in the view of Fig. 6, it will be observed that the cutting edges 27 and 28 are not strictly parallel with each other but converge slightly toward each other in the direction of the depth gauge 23. The cutter element is so positioned and retained within the receptacle socket 17 that the upper edge 27 extends substantially at right angles with respect to the vertical side walls 32 of the kerf whereby the cutting edge 29 of the cutter head, as viewed in Fig. 6, is inclined with respect to the immediately adjacent kerf side wall forming a clearance 33 between the kerf side wall and the lower portion of the cutter head. This clearance is important in order that binding frictional engagement will not occur between the outer flat side of the cutter head adjacent the cutting edge 29 and the kerf side wall and also so that the corner juncture between the cutting edges 28 and 29 will be held out of contact with wood during normal cutting operations. Referring to the forward end view, Fig. 3, of the receptacle formed on the upper end of the chain link 14, it will be observed that the forward edges of the side plate portions 16 are provided with a pair of notches 34 adapted for cooperatively receiving a rearwardly extending key 35 on the cutter head which may, for example, be formed on the rear end of the depth gauge portion 23 as shown more clearly in the view of Fig. 5. As shown in Fig. 3, the notches 34 are not diametrically opposed with respect to each other but are both spaced slightly above the horizontal centerline such as by a 4° angle as indicated by the angle 36. The spacing between the notches 34 extending around the top of the receptacle, therefore, is approximately 172°. By such disposition of the notches 34, a clearance angle 33 of approximately 4° will be maintained between the cutter head and the adjacent kerf side wall. The dotted lines 37 shown in Fig. 6 illustrate in cross-sectional view the configuration of successive cuts made by alternate right and left cutter elements provided on the saw chain.

The action of the depth gauge portion 23 will now be described with particular reference to the view of Fig. 7. Attention is first directed to the fact that the longitudinal axis for the receptacle socket formed on the chain link 14 is inclined slightly downwardly and rearwardly by an angle indicated at 39 with respect to the longitudinal centerline of the saw chain indicated by the dotted line 41 through the centers of the pivot pins 16. The upper corner 42 of the depth gauge 23, as viewed in Fig. 7, therefore engages against and rides upon the bottom wall of the kerf indicated at 43 and thereby limits the depth of cut to be made by the upper cutting edge 27 of the cutter head. The shaving of wood removed from the kerf and indicated at 44 passes into the recess formed in the face surface of the cutter head, travels downwardly thereacross and is directed forwardly by the bevel surface at the bottom of the cutter head defining the cutting edge opposite the edge 27 whereupon the shaving is pushed forwardly and in the direction of chain travel. The shaving is shown buckled up at 45 which will occur as the space between adjacent cutter elements on the saw chain becomes filled with shavings.

By varying the clearance between the upper corner of the depth gauge and the cutting edge, in the horizontal direction, as viewed in Fig. 7, the depth of cut to be taken may be varied. It is my intention that cutter units be manufactured for different depths of cuts, such as 20, 30, 40 thousandths inches and that such figures be stamped on the inner face of the depth gauge, as indicated by the numeral 40 in Fig. 7. The user can thus replace any given set of cutters by a different set as he switches the use of the saw from hard or frozen wood to soft wood, and vice versa for maximum cutting efficiency.

Referring again to Fig. 6, it will be observed that the outermost lateral extent of the depth gauge portion 23 from the central plane of the link is substantially equal to the distance of offset of the side wall cutting edge 29 whereby the depth gauge portion 23 acts as a gauge to space and maintain the side wall cutting edge 29 a predetermined distance from the opposite side wall of the kerf. Thus the tooth may not be crowded inwardly to permit a reduction in the kerf width which, if it occurred, might cause the chain to bind.

Referring again to the views of Figs. 4 and 5, it will be observed that the cutter unit is symmetrical as regards both the cutting edges 27 and 28, the cutting edge 27 being effective for making a cut on the right-hand side of the kerf, but if the cutter element were rotated about its longitudinal axis so as to place the cutting edge 28 uppermost, as viewed in Fig. 4, the same cutter element will be effective for cutting the kerf on the left-hand side. The depth gauge 23 is also symmetrical as regards the opposed right and left cutting edges 27 and 28 so that the depth gauge portion will be effective for limiting the depth of cut to be made by either cutting edge. Moreover, it will be obvious that while one of the cutting edges is in the operative position, no wear will occur upon the opposed cutting edge. Thus when one of the cutting edges becomes worn and dull, then the cutter element may be reversed upon the saw chain so as to bring the sharp opposite cutting edge into operative position.

For facilitating removal of the cutter units from the saw chain in the field, the slit in the upper surface of the receptacle formed on the chain link 14 is widened as indicated at 19 in Figs. 2 and 4 for cooperatively receiving the end of a screw driver blade so that upon twisting of the driver blade, the receptacle forming portions 16 of the side plates may be sprung slightly apart relieving the pressure upon the shank portion 21 of the cutter element. Should the cutter element be stuck in the receptacle socket, then by tapping against the rear end of the shank portion extending beyond the rear end of the receptacle socket, the cutter unit may be driven slightly forwardly within the socket, at least sufficiently so as to provide a clearance between the cutter head 22 and the adjacent end wall of the receptacle so that the end of the screw driver may be inserted therewithin for further facilitating the forcible extraction of the cutter element from the receptacle socket.

The cutter units comprising the shank portion 21, the cutter head 22 and the depth gauge 23 may be manufactured as single integral units or, if desired, the face portion of the cutter heads may be made separately and assembled in place upon the remainder of the cutter element as indicated in the view of Fig. 8. The cutter unit as shown in this view includes a shank portion 21 and a depth gauge portion 23 as previously described and a base portion 51 provided with a recess indicated by dotted lines at 52 axially aligned with the shank portion 21. A face insert 53, which may be cast of carbide or some other hard cutting alloy, has a pin 54 extending from the rear surface thereof for cooperatively seating in the recess 52. The insert portion 53 may be suitably secured, such as by silver soldering or brazing, onto the base portion 51 so as to form a cutter element which in its finished form will correspond substantially to that shown in the views of Figs. 4 and 5.

The cutting edges 27, 28 and 29 may readily be sharpened, such as by dressing down the outer flat surface portions of the cutter head. This sharpening operation will be done at the factory, however, it being a purpose of the present invention to provide an inexpensive cutter unit, which when dulled through use will be replaced by a new one at a cost less than the expense of resharpening conventional saw chain cutter teeth. By reason of the fact that alloys may readily be used in forming the cutting edges of the present cutter units having greater wear resistance and hence longer cutting life than in cutter teeth of conventional saw chains, and since two long life cutting edges are thus provided on each cutter unit, the cost of replacement units will be norminal as compared with the maintenance expense of ordinary saw chains.

Having described the invention in what I consider to be a preferred embodiment, I desire to protect by the following claims all other modifications which may readily occur to one skilled in the art but falling within the spirit and scope of my present invention.

I claim:

1. In a saw chain, a pair of longitudinally spaced apart links including sprocket engaging root portions, a pair of oppositely disposed side plates pivotally joining said links together, said side plates including portions cooperatively defining at least in part a cylindrical socket, the axis of said socket extending substantially parallel with the longitudinal direction of the chain, the adjacent edge portions of said plate portions being spaced apart to define a slot extending lengthwise of said socket in the side thereof opposite said root portions, a removable cutter unit including an elongated cylindrical shank portion arranged in a snugly fitting relation in said socket, a cutter head on said shank portion defining two spaced apart substantially parallel cutting edges and a third cutting edge joining the ends of said two edges at substantially right angles with respect thereto, said cutting edges extending in a common plane normal to the axis of said shank portion, said parallel cutting edges being spaced equally from said axis, a depth gauge portion on said cutter unit extending parallel with said shank portion and ahead of said cutter head and disposed on the side of said cutter head opposite said third cutting edge, said depth gauge being centrally disposed with relation to said parallel cutting edges, a rearwardly extending protuberant key formed on said head, and a pair of oppositely disposed notches in the forward edge of said socket defining portions adapted to receive said key for positioning said cutter unit in either right or left operative cutting position.

2. In a saw chain, a link having a portion defining a cylindrical socket, the axis of said socket extending in the longitudinal direction of the chain, a removable cutter unit including an elongated cylindrical shank portion arranged in a snugly fitting relation in said socket, a cutter head on said shank defining a pair of spaced apart substantially parallel cutting edges and a third cutting edge joining the ends of said pair of edges at substantially right angles with respect thereto, said cutting edges all extending in a common plane normal to the axis of said shank portion, said pair of cutting edges being spaced equally from said axis, a depth gauge portion on said cutter unit extending parallel with said shank portion and ahead of said cutter head and disposed on the side of said cutter head opposite said third cutting edge, said depth gauge being centrally disposed with relation to said pair of cutting edges.

3. In a saw chain, a pair of longitudinally spaced apart links including sprocket engaging root portions, a pair of oppositely disposed side plates pivotally joining said links together, said side plates including portions cooperatively defining at least in part an elongated socket, the axis of said socket extending in the longitudinal direction of the chain, the adjacent edge portions of said plate portions being spaced apart to define a slot extending lengthwise of said socket in the side thereof opposite said root portions, a removable cutter unit including an elongated shank portion arranged in a snugly fitting relation in said socket, a cutter head on said shank portion defining a pair of spaced apart cutting edges, said cutting edges extending in a common plane normal to the axis of said shank portion, said cutting edges being spaced equally on the opposite sides of said axis, a rearwardly extending protuberant key formed on said head, and a pair of oppositely disposed notches in the forward edge of said socket defining portions adapted to receive said key for positioning said cutter unit in either right or left operative cutting position.

4. In a saw chain, a pair of longitudinally spaced apart links including sprocket engaging root portions, a pair of oppositely disposed side plates pivotally joining said links together, said side plates including portions cooperatively defining at least in part an elongated socket, the axis of said socket extending in the longitudinal direction of the chain, a removable cutter unit including an elongated shank portion arranged in a snugly fitting relation in said socket, a cutter head on said shank portion defining a cutting edge extending transversely of said link, a depth gauge portion on said cutter unit extending parallel with said shank portion and ahead of said cutter head, a rearwardly extending protuberant key formed on said head, and a key receiving notch in the forward edge of said socket defining portions for positioning said cutter unit in a predetermined operative cutting position.

5. In a saw chain, a link, receptacle means formed on said link for cooperatively receiving a removable cutter unit, said receptacle means being symmetrically disposed with respect to the central longitudinal plane of said link, said removable cutter unit including a shank portion cooperatively seated in said receptacle means, said cutter unit including a head having a cutting edge formed thereon and extending in the direction transversely of said link, one side of said cutter head being laterally offset with respect to said shank portion, and a depth gauge portion secured to said cutter unit and extending forwardly of said cutter head on the side thereof opposite said laterally offset side.

6. In a saw chain, a link, receptacle means formed on said link for cooperatively receiving a removable cutter unit, said receptacle means being symmetrically disposed with respect to the central longitudinal plane of said link, said removable cutter unit including a shank portion cooperatively seated in said receptacle means, said cutter unit including a head having a kerf bottom cutting edge formed thereon and extending in the direction transversely of said plane and a kerf sidewall cutting edge extending in a direction substantially parallel with said plane, said cutter head and cutting edges being laterally offset with respect to said shank portion and depth gauge means on said cutter unit for regulating the depth of cut thereof.

7. In a saw chain, a link, elongated tubular socket means formed on said link for cooperatively receiving a removable cutter unit, a cutter unit including a cylindrical shank portion adapted to be cooperatively received and retained in said socket means, said cutter unit including a head portion defining a cutting edge, and cooperating complementary means formed on said head portion and on the forward edge of said socket means for positioning said cutter unit in a predetermined angular relation with respect to the axis of said socket means.

8. In a saw chain, a link, receptacle means formed on said link for cooperatively receiving a removable cutter unit, a cutter unit including a shank portion adapted to be cooperatively received and retained in said receptacle means, said cutter unit including a head portion defining a pair of cutting edges spaced a substantially equal distance on opposite sides of the longitudinal axis of said shank portion and symmetrically converging together at a relatively slight angle, and cooperating complementary means formed on said head portion and on said receptacle means for positioning said cutter unit with either of said cutting edges extending at right angles with respect to the longitudinal central plane of the chain.

9. In a saw chain, a link unit comprising a pair of oppositely disposed side plates, said side plates including portions cooperatively defining an elongated socket extending in the direction longitudinally of the chain, a removable cutter unit including an elongated shank portion arranged in a snugly fitting relation within said socket.

10. In a saw chain, a link, cutter unit retaining means formed on said link including a pair of complementary spaced apart portions, a removable cutter unit including a shank, said portions tightly gripping the opposite sides of said shank, the adjacent edges of said complementary portions defining a slot for cooperatively receiving a tool for wedging said portions apart for facilitating removal of said cutter unit.

11. In a saw chain, a link, receptacle means formed on said link including a pair of complementary spaced apart portions, a removable cutter unit including a shank portion cooperatively mounted in said receptacle means, said receptacle portions normally tightly gripping said shank portion, the adjacent edges of said receptacle portions defining a slot for cooperatively receiving a tool for wedging said receptacle portions apart for facilitating removal of said cutter unit.

12. A link for a saw chain comprising a portion defining a cylindrical socket, the axis of said socket extending in the longitudinal direction of the chain, a removable cutter unit including an elongated, cylindrical shank portion arranged in snugly fitting relation in said socket, a cutter head on said shank defining a kerf bottom wall cutting edge and a kerf side wall cutting edge, a depth gauge portion on said cutter unit extending parallel with said shank portion and ahead of said cutter head and disposed on the side of said cutter head opposite said side wall cutting edge, said kerf side wall cutting edge and the outermost lateral limit of said depth gauge portion being spaced a substantially equal distance from the longitudinal central plane of said link.

13. A link for a saw chain comprising receptacle means for cooperatively receiving a removable cutter unit, said receptable means being symmetrically disposed with respect to the central longitudinal plane of said link, a cutter unit including a shank portion cooperatively seated in said receptable means, said cutter unit including a head having a kerf side wall cutting edge formed thereon laterally offset with respect to said shank portion and extending in a direction substantially parallel with respect to said plane, and a depth gauge portion secured to said cutter unit and extending forwardly of said cutter head on the side thereof opposite said laterally offset edge, the lateral extent of said depth gauge portion from the central plane of said link being substantially equal to the distance of offset of said edge.

14. A link for a saw chain comprising means defining a kerf bottom cutting edge, means defining a kerf side wall cutting edge offset laterally to one side of the central longitudinal plane of said link and extending substantially parallel thereto, and a depth gauge portion for limiting the depth of cut made by said kerf bottom cutting edge and extending forwardly thereof from the side of the link opposite said side wall cutting edge, the outermost lateral extent of said depth gauge portion from the longitudinal central plane of said link being substantially equal to the distance of offset of said side wall cutting edge.

15. A link for a saw chain comprising means thereon defining a kerf side wall cutting edge offset laterally to one side of the central longitudinal plane of said link and extending substantially parallel thereto, and a gauge portion extending from the side of the link opposite said side wall cutting edge for spacing said cutting edge a given distance from the opposite side wall of a kerf, the outermost lateral extent of said gauge portion from the longitudinal central plane of said link being substantially equal to the distance of offset of said side wall cutting edge.

16. A saw chain comprising a plurality of longitudinally spaced apart cutter links each defining a cutter unit receiving receptacle extending parallel to and in centered relation with the longitudinal central plane, all of said cutter unit receptacles being identical, a plurality of identical cutter units mounted one on each of said links, each of said cutter units having a shank portion cooperatively engaged in the corresponding receptacle and a head portion defining a pair of generally parallel, laterally spaced apart kerf bottom cutting edges extending in offset relation to the axis of said shank portion and spaced substantially equidistantly from said shank axis, said receptacles being adapted to receive a cutter unit therein with either of the kerf bottom cutting edges thereof in kerf cuting position whereby the operative cutting edge extends laterally of the chain in offset relation to the said central plane thereof, each of said cutter units having depth gauge means extending forwardly of said head portion thereof and operative to regulate the depth of cut of either of the kerf bottom cutting edges of the cutting unit.

17. In a saw chain, a link, a cutter unit for mounting on said link in either of two predetermined positions, said cutter unit defining a pair of cutting edge portions optionally effective one portion for cutting from the right side of the kerf in one of said cutter unit positions and a second portion for cutting from the left side of the kerf in the other of said cutter unit positions, said cutter unit including a depth gauge element for regulating the depth of cut of either of said cutting edge portions, and receptacle means on said link for removably receiving and retaining said cutter unit on said link in either of said positions.

18. In a saw chain, a link defining a cylindrical receptacle for cooperatively receiving a removable cutter unit, the axis of said receptacle being inclined outwardly and forwardly with respect to the longitudinal center line of the chain, said removable cutter unit comprising a shank portion cooperatively received in said receptacle, said cutter unit including a head portion defining a pair of kerf bottom cutting edges spaced a substantially equal distance on opposite sides of the longitudinal axis of said shank portion, said cutter unit being adapted to be positioned with either of said cutting edges in kerf bottom cutting position, and a depth gauge element on said cutter unit extending forwardly of said cutting edges parallel with the shank portion axis, said depth gauge element being spaced equidistantly between said cutting edges whereby said element is operative to regulate the depth of cut of either of said cutting edges.

References Cited in the file of this patent

UNITED STATES PATENTS

| | | |
|---|---|---|
| 482,033 | Atkinson | Sept. 6, 1892 |
| 1,244,785 | Sessions | Oct. 30, 1917 |
| 1,590,821 | Oakes | June 29, 1926 |
| 1,979,001 | Kankos | Oct. 30, 1934 |
| 2,036,327 | Fulke | Apr. 7, 1936 |
| 2,508,784 | Cox | May 23, 1950 |
| 2,530,569 | Daddona | Nov. 21, 1950 |
| 2,564,989 | Ohman | Aug. 21, 1951 |

FOREIGN PATENTS

| | | |
|---|---|---|
| 16,476 | Great Britain | Sept. 29, 1891 |